May 22, 1962  C. M. LEE  3,035,503
AUTOMATIC EXPOSURE CONTROL FOR PHOTOGRAPHIC CAMERAS
Filed May 18, 1959
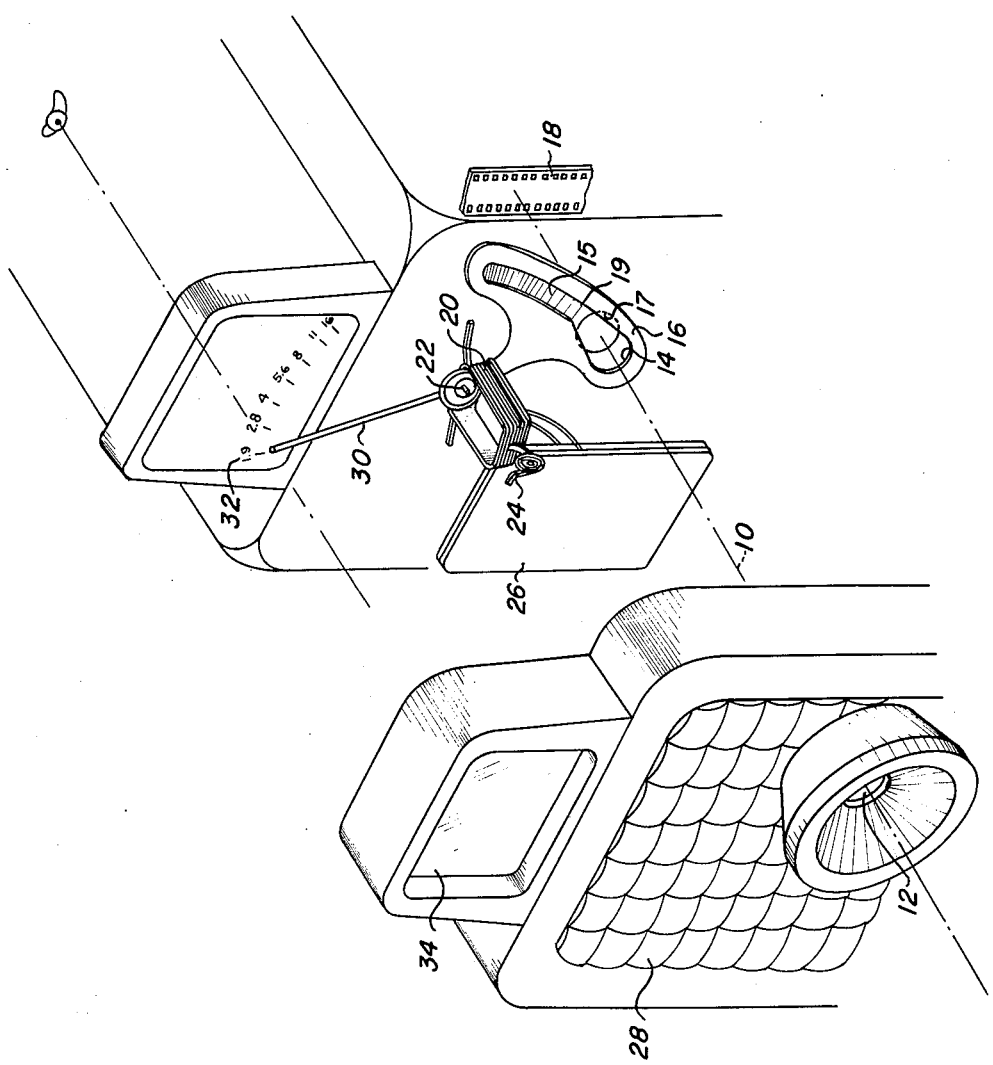
CHARLES M. LEE
INVENTOR.
BY R. Frank Smith
Robert W. Hampton
ATTORNEYS

United States Patent Office 3,035,503
Patented May 22, 1962

3,035,503
AUTOMATIC EXPOSURE CONTROL FOR PHOTOGRAPHIC CAMERAS
Charles M. Lee, Rochester, N.Y., assignor to Eastman Kodak Company, Rochester, N.Y., a corporation of New Jersey
Filed May 18, 1959, Ser. No. 813,712
7 Claims. (Cl. 95—64)

The present invention relates to diaphragms for photographic cameras and more particularly relates to improved constructions for diaphragms that are automatically regulated in response to changes in light intensity.

It is a common practice in motion picture and still cameras to automatically regulate the size of a diaphragm opening as a function of the brightness of a scene that is to be photographed. Such regulation is usually referred to as automatic exposure control and typically employs a photocell for receiving light from the scene, a permanent-magnet moving-coil instrument energized by the cell, and a diaphragm mechanism coupled to the moving coil of the instrument. The current output of the cell varies with the intensity of light on it and in turn varies the energization of the instrument to adjust the diaphragm mechanism as a function of the light intensity.

One of the simplest diaphragm mechanisms comprises a plane-polarized disk that moves with the coil of the instrument and is aligned with a second plane-polarized disk and a fixed aperture in the light path of the camera. The moving coil adjusts the angle between the polarization planes of the two disks and thereby adjusts the amount of light admitted into the camera. This diaphragm mechanism, although simple and relatively rugged, is limited in its utility because it always uses the maximum aperture area of the camera and therefore provides a minimum depth of focus.

A second diaphragm mechanism, in which the aperture area is varied and which therefore provides a greater depth of focus as the admission of light is more restricted, comprises a single diaphragm vane moving with the instrument coil and having a generally teardrop- or V-shaped aperture that cooperates with a fixed aperture in the light path of the camera. As the coil moves in response to increased intensity of the incident light, the vane superimposes a narrower portion of its aperture over the fixed aperture. However, when one or more diaphragm vanes having this form of aperture are set for bright scenes, a very narrow portion of the vane aperture of each such vane is aligned with the fixed aperture and for high-speed films, this portion of the vane aperture must be so narrow that objectionable diffraction occurs. At such settings the depth of field is much greater than ordinarily necessary for high quality photographs.

It is therefore a principal object of the present invention to automatically control the area of the exposure aperture of a camera by means of an electric instrument driving one or more diaphragm vanes, each vane having an aperture that is of proper dimensions to avoid serious diffraction yet produce a useful depth of field at high scene brightness. This object is accomplished by providing each vane with an elongated aperture which initially tapers from a maximum width to a minimum width that will produce a useful depth of field and is free from any substantial diffraction. This minimum aperture width is continued throughout the remaining length of the aperture, while further light restriction is accomplished by providing a neutral density wedge to cover such remaining length of aperture.

It is therefore another object of the invention to regulate the admission of light to the film in a camera by means of one or more diaphragm vanes, each having an elongated aperture whose degree of light-restriction is a function of the distance from one end thereof of the portion aligned with the lens axis and which restricts light by a combination of tapered shape and a neutral density wedge.

Other objects of the invention will be apparent from the following description, reference being made to the accompanying drawing which shows an exploded isometric view of a camera embodying the invention.

Referring to the drawing, a typical camera which might employ the invention has a lens axis 10 along which are arranged a lens system indicated generally at 12, the aperture 14 of a diaphragm vane 16, a fixed aperture 17, a shutter (not shown) and a photosensitive surface such as a film strip 18. The diaphragm vane 16 is attached to the pivoted coil 20 of an exposure meter for rotation therewith to move various portions of the aperture 14 into alignment with the lens axis 10 and the fixed aperture 17 on that axis.

Coil 20 is pivoted at 22 and normally is maintained in a nonenergized position by return springs such as 24. The coil is connected to and energized by a photocell 26, which is disposed for illumination by scene lighting through a lens block 28. A pointer 30 on coil 20 may be provided to cooperate with an aperture scale 32 (shown reversed for convenient viewing in the drawing) in a viewfinder 34 mounted on the camera.

In a manner well known in the art, variations in scene brightness cause proportional variations in the output of cell 26 to pivot the coil 20 to an angular position that is a function of scene brightness. Vane 16 pivots with the coil to align various portions of aperture 14 with the lens axis, also as a function of scene brightness. At the nonenergized position of the coil, vane 14 is in its extreme counterclockwise position where the width of the aligned portion of aperture 14 is maximum.

The width of this aperture decreases from the maximum, corresponding to increasing scene brightness, until a position 19 of the aperture is reached. The width of the aperture at position 19 is chosen such that an exposure aperture formed thereby in cooperation with the fixed aperture 17 and any other similar vane apertures employed in the system, produces an acceptable depth of field but no substantial diffraction. After point 19, the width of aperture 14 decreases either not at all or very slightly throughout the remaining length of that aperture. However, in order to compensate for scene brightness greater than that corresponding to point 19, the light admission of aperture 14 must be decreased even though the aperture width remains constant or substantially constant. For this purpose, a neutral density wedge 15 is located in aperture 14 and extends from point 19 to the low-admission (counterclockwise) end of the aperture, becoming more dense as it approaches the latter end of the aperture.

The invention has been described in detail with particular reference to preferred embodiments thereof, but it will be understood that variations and modifications can be effected within the spirit and scope of the invention as described hereinabove and as defined in the appended claims.

I claim:
1. In a photographic camera having means for focusing an image of a viewed scene onto a photosensitive surface, the combination comprising: an exposure meter having a light-sensitive member disposed for illumination by light from said scene and having an output member moved under control of said light-sensitive member to any of a plurality of positions as a function of the brightness of said scene; at least one diaphragm vane coupled to said output member and having an elongated aperture movable relative to said focusing means in response to movement of said output member, for regulating the admission of scene light to said photosensitive surface, said aperture having a maximum width near a first end thereof and tapering to a narrower width at a position intermediate its ends, said aperture being of substantially constant width from said intermediate position to the second end thereof; and a neutral density optical wedge disposed in said aperture and extending from substantially said intermediate position to said second end.

2. The combination defined in claim 1, wherein said optical wedge increases in density substantially uniformly from said intermediate position to said second end of the aperture.

3. In a photographic camera having means for focusing an image of a viewed scene onto a photosensitive surface, the combination comprising: an exposure meter having a light-sensitive member disposed for illumination by light from said scene and having a coil pivoted under control of said light-sensitive member to an angular position which is a function of the brightness of said scene; at least one diaphragm vane coupled to said coil for pivotal movement therewith and having an elongated aperture movable relative to said focusing means, in response to pivoting said vane, for regulating the admission of scene light to said photosensitive surface, said aperture having a first, tapered portion and having a second portion of substantially constant width; and an optical filter mounted in said second portion of said aperture for attenuating the light transmitted through said second portion.

4. The combination defined in claim 3, wherein said filter is a chromatically substantially neutral wedge.

5. The combination defined in claim 4, wherein said wedge is of substantially uniform width throughout at least half of its length.

6. In a photographic camera having means for focusing an image of a scene onto a photosensitive surface, the combination comprising: an exposure meter having a photoelectric device energizable by scene light and having an output member positioned automatically as a function of the energization of said photoelectric device; at least one movable diaphragm vane positioned under control of said output member and having an elongated aperture movably cooperating with said focusing means in response to positioning of said output member, for regulating illumination of said photosensitive surface by scene light, said aperture having first and second contiguous portions, said first portion having a generally tapered configuration, the junction between said first and second portions being defined by an irregularity in at least one edge of said aperture; and an optical filter incorporated in said second portion for limiting the illumination of said photosensitive surface by scene light.

7. In a photographic camera having means for focusing an image of a scene onto a photosensitive surface: the combination comprising: an exposure meter having a photoelectric device energizable by scene light and having an output member positioned automatically as a function of the energization of said photoelectric device; at least one movable diaphragm vane positioned under control of said output member and having an elongated aperture movably cooperating with said focusing means in response to positioning of said output member, for regulating illumination of said photosensitive surface by scene light, said aperture having first and second portions joining each other at an irregularity in the contour of said aperture, at least said first portion having a generally tapered configuration; and an optical filter incorporated into the second portion of said aperture for limiting the illumination of said photosensitive surface by scene light.

References Cited in the file of this patent

UNITED STATES PATENTS

| 443,386 | Bigelow | Dec. 23, 1890 |
| 2,369,473 | Luboshez | Feb. 13, 1945 |

FOREIGN PATENTS

| 145,699 | Austria | May 11, 1936 |